June 17, 1947. J. B. WARD 2,422,510
VESSEL HANDLE ASSEMBLY
Filed Aug. 21, 1945
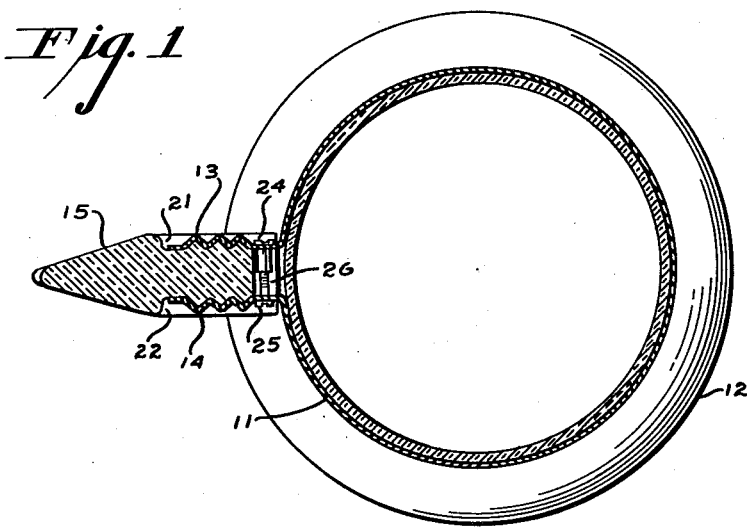
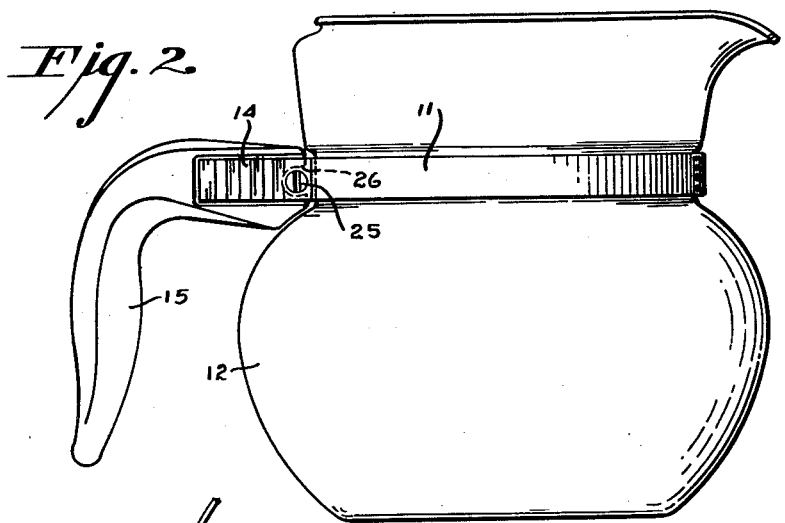
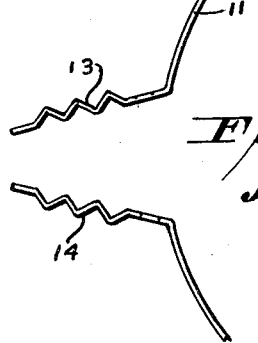
Inventor
JOHN B. WARD
By Knight & Fowler
Attorneys Patented June 17, 1947

2,422,510

UNITED STATES PATENT OFFICE 2,422,510

VESSEL HANDLE ASSEMBLY

John B. Ward, Corning, N. Y., assignor to Corning Glass Works, Corning, N. Y., a corporation of New York Application August 21, 1945, Serial No. 611,777

4 Claims. (Cl. 294—27)

The present invention relates to handle assemblies for culinary vessels and particularly to handle assemblies wherein the handle proper is composed of vitreous or similar material.

The prime object of the invention is a handle assembly which can be economically manufactured.

Another object is a handle assembly wherein the stress on the handle per se by its retaining hardware is distributed over a large surface area so that danger of breakage in use is reduced to a minimum.

A still further object is a handle per se whose surfaces, adapted to be engaged by hardware, are free of sharply defined changes in contour so that danger of highly concentrated or localized stress between the handle and parts of the hardware, and the consequent danger of breakage from this cause, is avoided.

Further objects and features of the invention will become more apparent from an examination of the accompanying drawing.

Fig. 1 is a horizontal sectional view of an assembly embodying the invention.

Fig. 2 is a side elevation of the assembly.

Fig. 3 is an enlarged plan view of a fragment of the assembly band.

The assembly comprises a band 11, adapted to embrace the particular vessel 12 with which it is to be employed, and preferably is in the form of a one piece strap whose ends comprise outwardly extending corrugated arms 13 and 14 whose corrugations may be said to be of zigzag or sloping wall configuration. As indicated in Fig. 3, the band is of springy material, preferably although not necessarily, tensioned to normally hold the arms 13 and 14 closest to one another at their free ends.

A handle 15, to be clamped between arms 13 and 14, is provided with grooves 21 and 22 arranged parallel to one another in opposite sides of the handle and having corrugations in the bottom surfaces thereof matching the corrugations in arms 13 and 14. The band 11, after being placed about an article, such as the vessel 12 or the like, has its arms 13 and 14 forced into the seats provided by grooves 21 and 22 and both the vessel and handle are held tightly clamped in fixed relation to one another by screw members 24 and 25 which pass through arms 13 and 14 and through a notch 26 formed in the end of handle 15.

As will be appreciated, with the band 11 tensioned as described and its arms 13 and 14 drawn into parallel relation in grooves 21 and 22, the compressional forces between the arms and handle are well distributed throughout the length of the arms. Also, by the use of interfitting corrugated parts, the surface area of seizure is increased and interlocking of the handle and band attained which prevents relative lengthwise movement between the arms 13 and 14 and the handle 15. The corrugations also tend to prevent relative rocking movement in a vertical plane between the handle and arms in lifting the vessel under load. The side walls of grooves 21 and 22 as well as the portion of handle 15 partly encircling screw members 24 and 25 also, to a lesser extent, aid in preventing and/or limiting relative rocking movement to an absolute minimum, and also prevent material relative movement in planes paralleling the corrugated surfaces. Further, it will be observed that the depth of grooves 21 and 22 at the shallowest points at least equals the thickness of the arms 13 and 14 so that their entire edge surfaces are cooperative with the side walls of grooves 21 to prevent the last mentioned relative movement.

As will be appreciated, the foregoing construction avoids abrupt changes in the contour of the handle 15 and distributes the strain placed on it by the hardware over large surface areas so that danger of breakage of the handle by localized stresses or strain is reduced to an absolute minimum.

What is claimed is:

1. In a handle assembly, a thin sheet metal band shaped to embrace a vertically disposed side wall portion of a vessel and having its opposite site ends terminating in clamping arms which extend outwardly from one side of the embraced vessel, each of said arms having corrugations which run transverse to the arms and which have walls sloping toward and away from one another, a handle having a portion to be received between said arms, said portion having recesses in its sides whose walls correspond in outline to the corrugations of said arms, and a clamping element located between the ends of said arms and the vessel side wall adapted to clamp said arms to said handle portion and to cause walls of said recesses to intimately engage walls of the corrugations in the arms, said arms having apertures and said handle portion having a recess through which said clamping element passes.

2. In a handle assembly, a thin sheet metal band shaped to embrace a vertically disposed side wall of a vessel and having its opposite ends terminating in clamping arms which, when unrestrained, extend in converging planes outwardly from one side of the embraced vessel, each of said arms having corrugations which run transverse to the arms and which have sloping walls of a shape to collectively impart a zigzag configuration to the arms, a handle having a portion to be received between said arms, said portion having recesses in its sides whose walls correspond in outline to the corrugations of said arms, and a clamping element located between the ends of said arms and the vessel side wall adapted to clamp said arms to said handle portion and to cause walls of said recesses to intimately engage walls of the corrugations in the arms, said arms having apertures and said handle portion having a substantially semi-cylindrical recess through which said clamping element passes.

3. In a handle assembly, a flat band shaped to embrace a vertically disposed side wall portion of a vessel and having its opposite ends terminating in clamping arms which extend outwardly from one side of the embraced vessel, each of said arms being corrugated with the corrugations running substantially transverse to the arms and having sloping walls of a shape to collectively impart a zigzag configuration to their broad surface areas, a handle having a portion to be received between said arms, said portion having recesses in its sides whose walls correspond in outline to the corrugations of said arms, and a clamping element located between the ends of said arms and the vessel side wall adapted to clamp said handle portion tightly between said arms throughout their length, said arms having apertures and said handle portion having a recess through which said clamping element passes.

4. In a handle assembly, a flat band shaped to embrace a vertically disposed side wall portion of a vessel and having its opposite ends terminating in clamping arms which extend outwardly from one side of the embraced vessel, each of said arms being corrugated with the corrugations running substantially transverse to the arms and having sloping walls of a shape to collectively impart a zigzag configuration to their broad surface areas, a handle having a portion to be received between said arms, said portion having recesses in its sides whose walls correspond in outline to the corrugations of said arms and the bottoms of said configurations following those of the surfaces of the arms and of a minimum depth approximately corresponding to the thickness of the material from which the band is made, and a clamping element located between the ends of said arms and the vessel side wall adapted to clamp said handle portion tightly between said arms throughout their length, said arms having apertures and said handle portion having a recess through which said clamping element passes.

JOHN B. WARD.

REFERENCES CITED

The following references are of record in the file of this patent:

UNITED STATES PATENTS

| Number | Name | Date |
|---|---|---|
| 759,704 | Hardsocg | May 10, 1904 |
| 2,137,884 | Weeks | Nov. 22, 1938 |
| 2,305,492 | Poglein | Dec. 15, 1942 |
| 2,359,189 | Alsdorf | Sept. 26, 1944 |
| 2,378,867 | Reichart | June 19, 1945 |